United States Patent
Isaacs

(10) Patent No.: US 6,666,405 B2
(45) Date of Patent: Dec. 23, 2003

(54) ADJUSTABLE WEIGHT BALLASTS FOR WEIGHING DOWN DIFFERENTLY SIZED LIGHTER-THAN-AIR BALLOONS

(76) Inventor: Michael S. Isaacs, 175 Felmouth St., Brooklyn, NY (US) 11235

( * ) Notice: Subject to any disclaimer, the term of this patent is extended or adjusted under 35 U.S.C. 154(b) by 46 days.

(21) Appl. No.: 10/100,604

(22) Filed: Mar. 18, 2002

(65) Prior Publication Data

US 2003/0173457 A1 Sep. 18, 2003

(51) Int. Cl.$^7$ ................................................ B64B 1/70
(52) U.S. Cl. ............................ 244/33; 244/93; 244/94; 244/96
(58) Field of Search ........................... 244/31, 33, 93, 244/94, 96; 446/220, 226, 221–225; 40/214

(56) References Cited

U.S. PATENT DOCUMENTS

| | | | | |
|---|---|---|---|---|
| 2,871,597 A | * | 2/1959 | Yost | 244/93 |
| 3,744,177 A | * | 7/1973 | Cron, Jr. | 43/43.12 |
| 4,307,537 A | * | 12/1981 | Bergmann | 446/220 |
| 4,547,167 A | * | 10/1985 | Bergmann | 446/220 |
| 5,893,790 A | * | 4/1999 | Montgomery | 446/220 |
| 6,312,364 B1 | * | 11/2001 | Selsam | 482/93 |

FOREIGN PATENT DOCUMENTS

GB 861121 * 2/1961 ................... 244/93

* cited by examiner

Primary Examiner—Galen L. Barefoot
(74) Attorney, Agent, or Firm—Lackenbach Siegel, LLP

(57) ABSTRACT

An adjustable weight ballast for lighter-than-air balloon with a predetermined lift is disclosed, comprising at least two individual weights. There is a first means on each individual weight for selectively attaching two or more weights to each other to form a composite weight having a total weight at least equal to the predetermined lift of the balloon, and a second means for tethering the lighter-than-air balloon to this composite weight, in which manner a ballast for a balloon can have its weight incrementally adjusted to an amount just greater than the balloon's predetermined lift to thus securely tether the balloon to a surface on which the composite weight is supported without significantly exceeding the lift of the balloon.

21 Claims, 4 Drawing Sheets

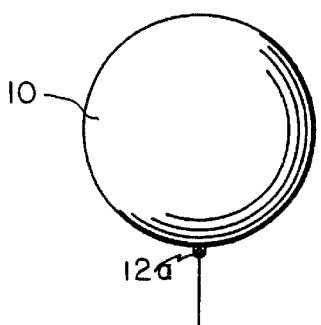
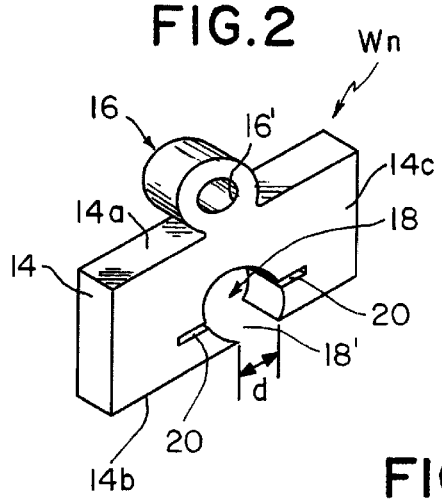
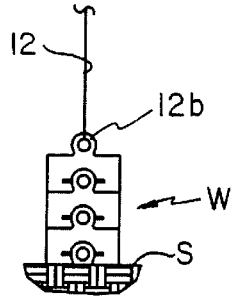
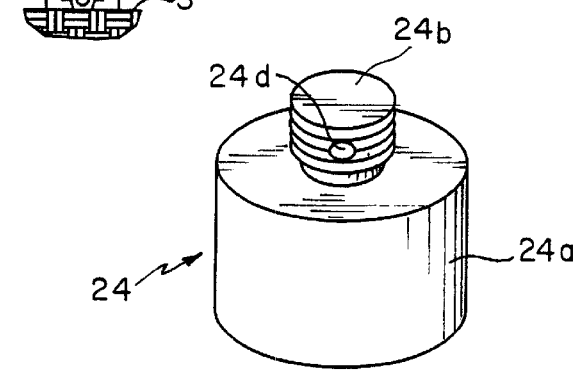
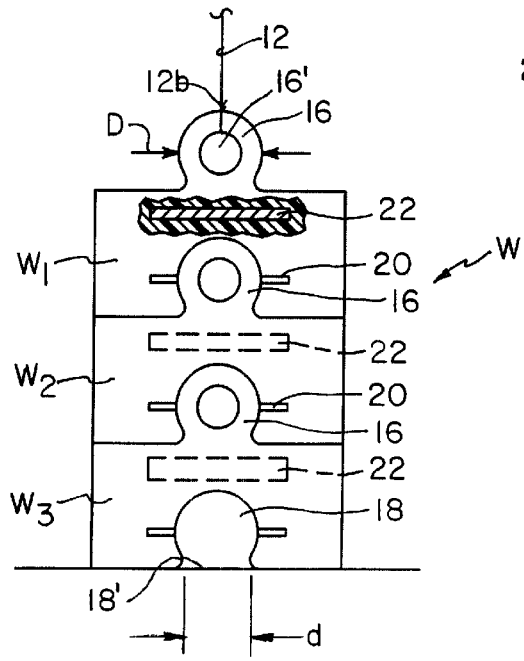
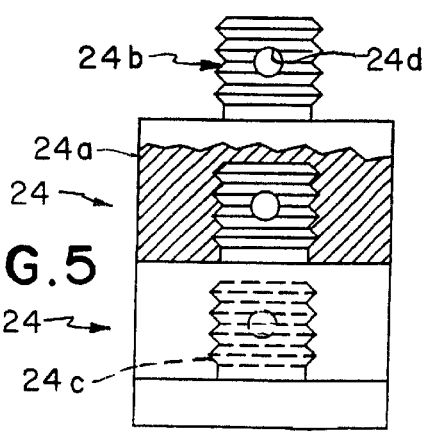

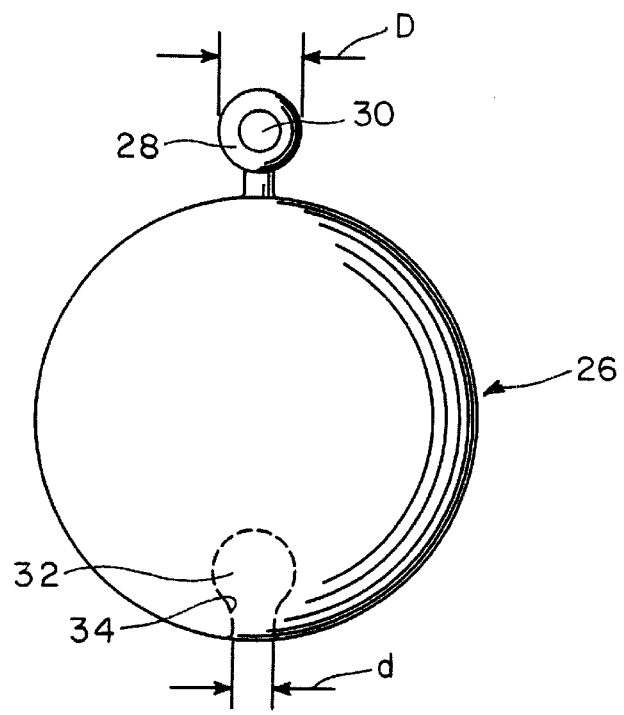
FIG. 6
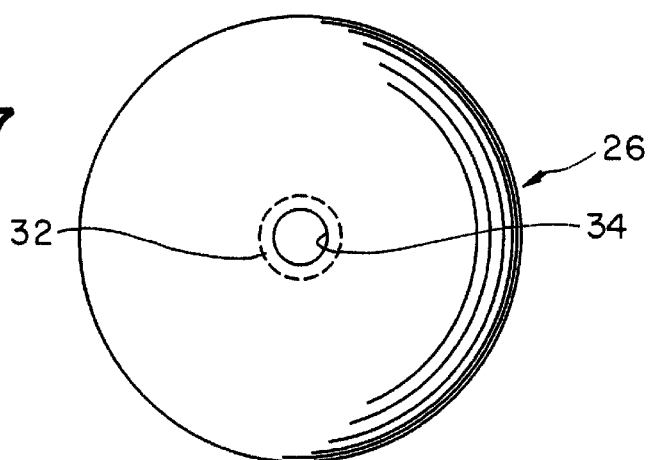
FIG. 7
FIG. 8
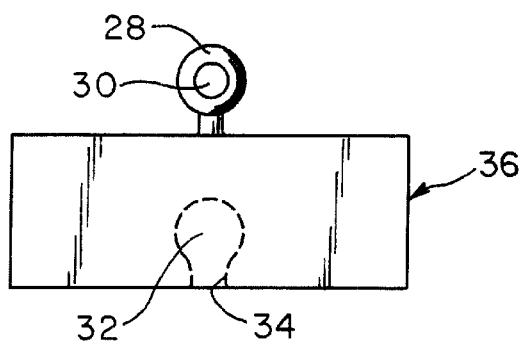
FIG. 9
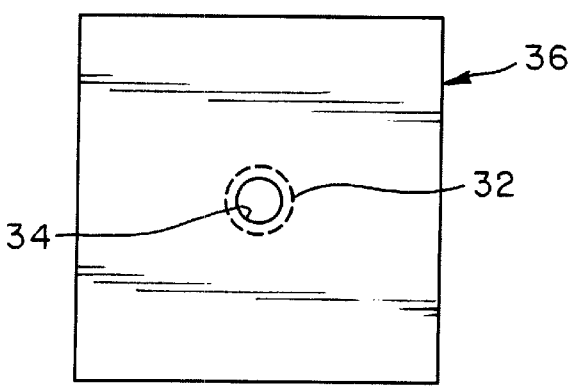

ADJUSTABLE WEIGHT BALLASTS FOR WEIGHING DOWN DIFFERENTLY SIZED LIGHTER-THAN-AIR BALLOONS

BACKGROUND OF THE INVENTION

1. Field of the Invention

This invention generally relates to lighter-than-air balloons and, more specifically, to adjustable weight ballasts for tethering lighter-than-air balloons to a surface.

2. Description of the Prior Art

Balloons, both mylar and latex, are frequently filled with helium to render them lighter than air. Because of the lift that results, such balloons frequently need to be tied by means of a string or otherwise to an object on the ground to prevent them from floating away. Such balloons are frequently used singly or in batches both for decorative purposes as well as to celebrate various events, functions, etc. One or more balloons are, for example, frequently used as centerpieces at various functions to celebrate birthdays, weddings, etc. Such balloons typically use bright color and may be inscribed with images and/or text reflecting the nature of the event or function.

One problem with lighter-than-air balloons, as suggested, is that they often must be tethered to a surface to prevent them from floating away. This has been done in the past by using a string for each balloon that is tied at the upper end to the balloon and at the lower end to an object that rests on a surface such as a table. In those instances where objects are provided on the table to which the balloons can be tethered, such as a floral arrangement, the strings can sometimes be tied to those. However, when such objects are not available to serve as ballast for the balloons, separate weights may need to be used solely for this purpose. This has, however, presented a problem to those individuals who inflate the balloons and try to secure the balloons to a surface. Because balloons are different sizes and, therefore, have different volumes, they receive smaller or larger amounts of helium, and this results in different levels of lift.

A problem in the industry has been to provide ballasts that are sufficient to weigh a balloon down and prevent it from floating away while, at the same time, not excessively weighing them down, since more material is used than necessary for a given balloon. This results in additional and unnecessary costs. One attempt to overcome this problem has been to provide a variety of different ballasts, each having different weights, so that larger ballasts can be used for larger balloons, while smaller ballasts can be used for smaller balloons. Using different-sized weights for different-sized balloons has, however, required users to stock more than one weight. Also, when size and inventory become depleted, the other or remaining weights may not be adequate to tether a particular balloon.

SUMMARY OF THE INVENTION

It is an object of the present invention adjustable weight ballasts for weighing down differently sized lighter-than-air that do not have the disadvantages inherent in prior art weights.

It is another object of the present invention to provide adjustable weight ballasts that are simple in construction and economical to manufacture.

It is still another object of the invention to provide adjustable weight ballasts as in the previous objects that can assume numerous configurations and that can be made of different materials while readily being adjusted to a desired weight adequate to tether a lighter-than-air balloon of any given size.

It is yet another object of the invention to provide adjustable weight ballast of the type previously suggested that will allow a weight to be incrementally adjusted to an amount just greater than the predetermined lift of a given lighter-than-air balloon to thereby securely tether the balloon to a surface on which the weight is to be supported without significantly exceeding the lift of the balloon.

In order to achieve the above objects, as well as others that will become apparent hereafter, an adjustable weight in accordance with the present invention is in the form of ballast for lighter-than-air balloons having a predetermined lift. The ballast comprises at least two individual weights. First means is provided on each individual weight for selectively attaching two or more such weights to each other to form a composite weight having a total weight at least equal to the predetermined lift of the balloon. Second means is provided for tethering the lighter-than-air balloon to the composite weight. In the way, a ballast for a balloon can have its weight incrementally adjusted to an amount just greater than the lift of the balloon without significantly exceeding such weight. The individual weights may be identical and weigh the same, or an assortment of such weights may be provided that have different weights but can be attached to each other to create a total composite weight necessary to tether a given balloon.

BRIEF DESCRIPTION OF THE DRAWINGS

With the above and additional objects and advantages in view, as will hereinafter appear, this invention comprises the devices, combinations and arrangements of parts hereinafter described by way of example and illustrated in the accompanying drawings of preferred embodiments in which:

FIG. 1 is a diagrammatic side elevational view of a lighter-than-air balloon tethered to a surface by an adjustable weight ballast in accordance with the present invention;

FIG. 2 is a perspective view of an individual weight in accordance with the invention of the type shown in FIG. 1, showing the details of the construction;

FIG. 3 is an enlarged side elevational view, partially in cross section, showing the manner in which three individual weights of the type shown in FIG. 2 can be attached to each other to form the composite weight shown in FIG. 1;

FIG. 4 is a perspective view of another embodiment of a ballast weight in accordance with the present invention;

FIG. 5 is a side elevational view, partially in cross section, illustrating the manner in which two individual weights of the type shown in FIG. 4 can be attached or secured to each other and readied for attachment to a lighter-than-air balloon;

FIG. 6 is a side elevational view of still another embodiment of a ballast weight in accordance with the invention;

FIG. 7 is a bottom plan view of the ballast weight shown in FIG. 6;

FIG. 8 is a side elevational view of still another embodiment of a ballast weight in accordance with the invention;

FIG. 9 is a bottom plan view of the embodiment of the ballast weight shown in FIG. 8;

DETAILED DESCRIPTION OF THE PREFERRED EMBODIMENTS

Figure 10:
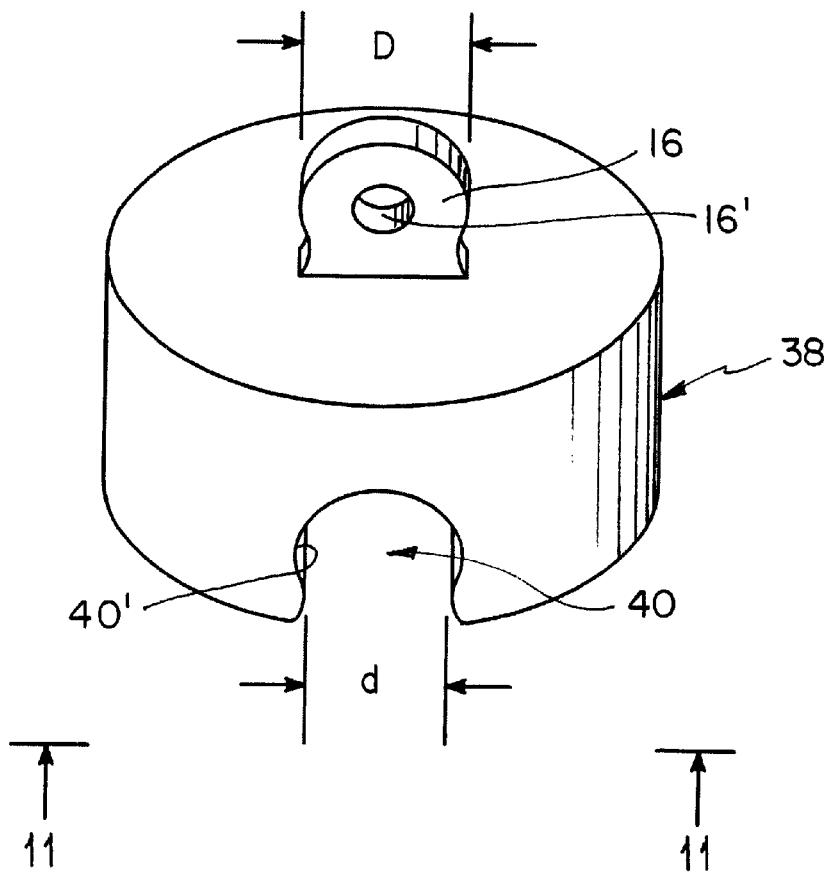
FIG. 10 is a perspective view of yet another embodiment of a ballast weight in accordance with the invention.

Turning now to the drawings, in which identical or similar part are designated by the same reference numerals throughout, and first referring to FIG. 1, an adjustable weight ballast in accordance with the invention is generally designated by the reference letter W. The weight or ballast W is to be used with a lighter-than-air balloon 10 which, when filled with helium or other lighter-than-air gas, creates a predetermined lift. The objective of the invention is to tether the balloon as shown in FIG. 1, such as by means of a string 12 tied at the upper end 12a to the balloon 10 and at lower end 12b to the weight W in order to weigh down the balloon and maintain it on a surface S. The weight W is formed, in accordance with the invention, by selectively attaching two or more weights, to be more fully described in connection with FIGS. 2 and 3, that have a total weight at least equal to the predetermined lift of the balloon. Suitable means is provided for tethering the balloon to the composite weight W. The ballast or weight W can be incrementally adjusted in its weight to an amount just greater than the lift of the balloon to securely tether the balloon to the surface S on which the composite weight W is support, without significantly exceeding the lift of the balloon.

Referring to FIGS. 2 and 3, one example of an individual weight 14 is shown, one that is generally in the form of a rectangular slab 14 having an upper surface 14a and a lower surface 14b. Provided on the upper surface 14a is a generally circular attaching member 16 that projects from the upper surface 14a of the body member 14 and is provided with a central through opening or hole 16', as shown. Provided proximate to the lower surface 14b is a cavity 18 that defines a radius or diameter that generally corresponds to that of the circular projecting member 16, the cavity 18 having an opening 18' in the lower surface 14b that has a dimension "d" that is less than the diameter "D" of the projecting member 16. As best shown in FIG. 3, the projecting member 16 can be received within the cavities 18 to interlock adjacent, individual weights. Three such weights are shown interlocked in FIG. 3. It will be clear that with the configuration shown in FIGS. 2 and 3, the projecting member 16 can be inserted into the cavity 18 either by sliding the same laterally through the major wall or surface 14c of the body member 14 or by forcing same through the lower opening 18' of the cavity 18 by at least partially and temporarily deforming either the projecting member 16 or the cavity 18. To make the body member somewhat more flexible and facilitate the passage of the projecting member 16 through the opening 18', suitable slots 20 may be provided to make the lower part of the body member somewhat more resilient or flexible.

The body members 14 may be sections cut from an extruded bar having the shape indicated, or may be molded to provide the desired shape. The entire assembly shown in FIG. 2 has a weight Wn that can be selected to have a desired weight. If the body member 14 is molded out of a plastic material, for example, the weight of the member can be increased by embedding metallic weights 22 that may be, for example, made of lead. In FIG. 3, the three stacked individual weights are shown to have weights W1, W2 and W3. Of course, all of these can be the same if the dimensions of the weights are the same and each have an equal weight embedded therein. Thus, for example, if the balloon 10 has a lift of 20 oz., three weights of 8 oz. each can be used to provide a total ballast weight of 24 oz. As the balloon are made larger, additional individual weights can be added. The objective would generally be to utilize and stock only one size weight, such as a 5-oz. weight, a 10-oz. weight, etc. The weights should not individually be too heavy, since the objective of the present invention is to use as little ballast weight as is necessary, without substantially exceeding the balloon's lift.

Referring to FIGS. 4 and 5, two identical individual weights are shown. The embodiment shown in FIGS. 4 and 5 may be formed of metal, such as lead. As with the previous embodiment, each individual weight 24 is formed of a body member 24a that has a cavity 24c therein. An attaching member 24b is provided that projects from the body member 24a in a direction generally opposite to the direction of opening of the cavity and generally conforms to the size and shape of the cavity. In this way, the cavity and attaching member 24c, 24a, respectively, are shaped to secure two individual weights to each other when the attaching member 24b of one individual weight is received within the cavity 24c of another individual weight. In FIGS. 4 and 5, the cavity is shown to be cylindrical and is internally threaded, while the projecting member 24a is externally threaded for being threadedly meshed within a threaded cylindrical cavity, as shown in FIG. 5. A hole 24d in the projecting member 24b corresponds to the opening 16' in FIG. 2.

Because the objective of the present invention is to provide a simple and inexpensive adjustable ballast for balloons, it is intended that individual weights in accordance with the present invention can be quickly and conveniently attached to each other and detached from each other, as needed. Referring to FIGS. 6 and 7, a generally spherically body member 26 in the form of a weight has an entry opening 34 leading to an internal cavity 32. The entry opening 34 has a tranverse dimension "d", which is smaller than the maximum transverse dimension of the cavity 32, in a direction parallel to the exterior surface. The projecting member 28 has an associated maximum transverse dimension "D" that is greater than the dimension "d" of the entry opening and projects from the body member 26 as shown. The projecting member is preferably at least partially deformable.

Where the body members 26 are spherical, as shown in FIGS. 6 and 7, and the projecting members 28 are likewise spherical and dimensioned to be forced into the cavities 32 through the narrowing or constriction at the entry opening 34, the resulting composite weight is similar to a string of beads that are snapped together, each bead providing a predetermined incremental weight so that the use of a plurality of such weights 26 can provide a desired composite weight to overcome the lift of the balloon.

Referring to FIGS. 8 and 9, a slightly different embodiment 36 is illustrated that is similar in operation to the embodiment 26 shown in FIGS. 6 and 7, except that the body members 36 are essentially rectangular slabs as opposed to being spherical in shape. Otherwise, the selective snap attachment and detachment of individual weights of the type shown is the same.

Figure 11:
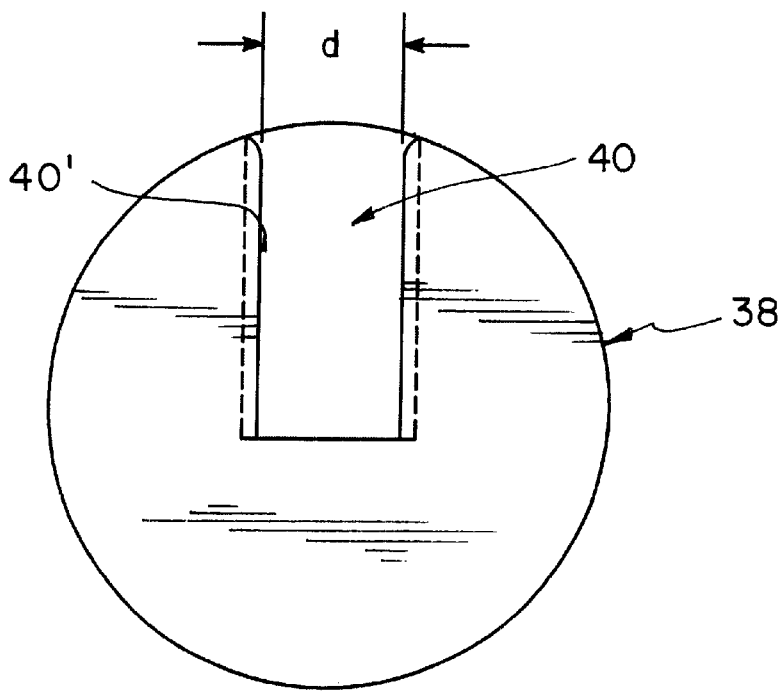
FIG. 11 is a bottom plan view of the embodiment of the ballast shown in FIG. 10.

Referring to FIGS. 10 and 11, a further embodiment 38 is illustrated in which a groove 40 is provided that has an additional lateral entry opening 40' on the lateral side of the body member. The projecting member 16 has a size and shape to allow same to slide through the lateral opening 40'. As with the previous embodiments, the necked-down configuration of the projecting member 16 also permits same to be forced through the lower entry opening, the dimensions "D" of the projecting member and dimension "d" of the entry opening being such as to allow snapping the projection into the cavity by causing at least partial deformation of either or both of the projecting member 16 and the body member 38. Regardless of how the interference fit is overcome, once the projecting member 16 is received within the cavity 40, two adjacent individual weights can be aligned to each other and maintained connected as suggested in FIG. 3. In order prevent the inadvertent sliding and separation of the projecting member 16 from the cavity 40, the dimensions of the projecting member 16 can be slightly larger than the corresponding dimensions of the cavity so as to provide at least a friction fit.

As with the previous embodiments, the embodiment 38 includes a hole 16' that is substantially transverse to the vertical direction of the ballast when the same is supported on a horizontal surface.

Figure 12:
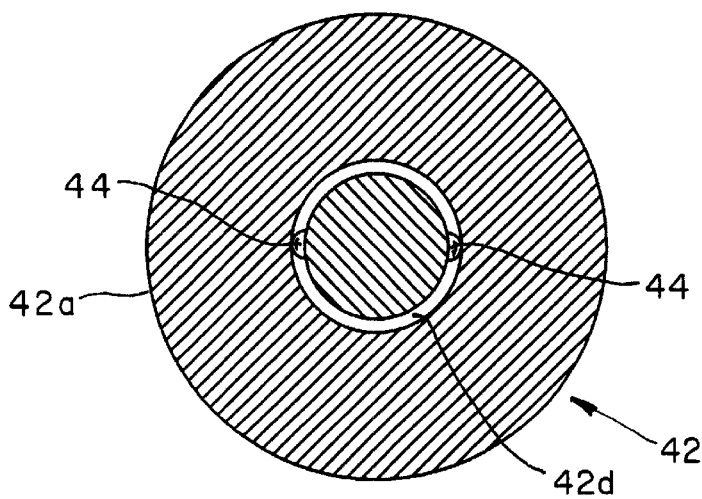
FIG. 12 is a cross sectional view of an additional embodiment of a ballast weight in accordance with the present invention, taken along line 12—12 in FIG. 13.
Figure 13:
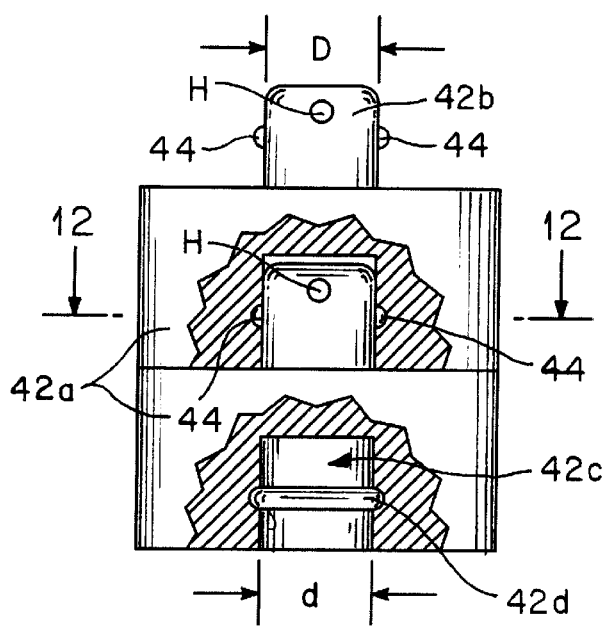
FIG. 13 is a side elevational view of the additional embodiment shown in FIG. 12, illustrating two individual weights in accordance with this embodiment joined to each other and shown in partial cross section to show the details for attaching the two individual weights to each other.

A still further embodiment of the present invention is illustrated in FIGS. 12 and 13, in which the individual weight 42 is provided with a body member 42a formed at the upper end thereof with a generally cylindrical post or projection 42b. On the axially opposite surface, the body member 42a is provided with a cavity 42c that is shown to be cylindrical and generally sized and configured to receive the post or projection 42b with little clearance. The attaching member 42b may include an annular bead provided on the projection 42b that results in an interference fit when the projection is initially inserted into the cavity 42c and dimensioned to be received in snap fitting relationship within an annular enlargement 42d in the cavity, as shown in FIG. 13. Although the cavity and the projecting member can assume any desired cross sectional configurations, they are shown to be circular cylindrical shapes in FIGS. 12 and 13, the cylindrical projection being shaped and dimensioned to be received within the cavity 42c with little clearance. Diametrically opposite radial protuberances 44 are provided on the projection 42b that result in an interference fit when the projection is inserted into the cavity, and dimensioned to be received in snap fitting relationship within the annular enlargement 42d.

Figure 14:
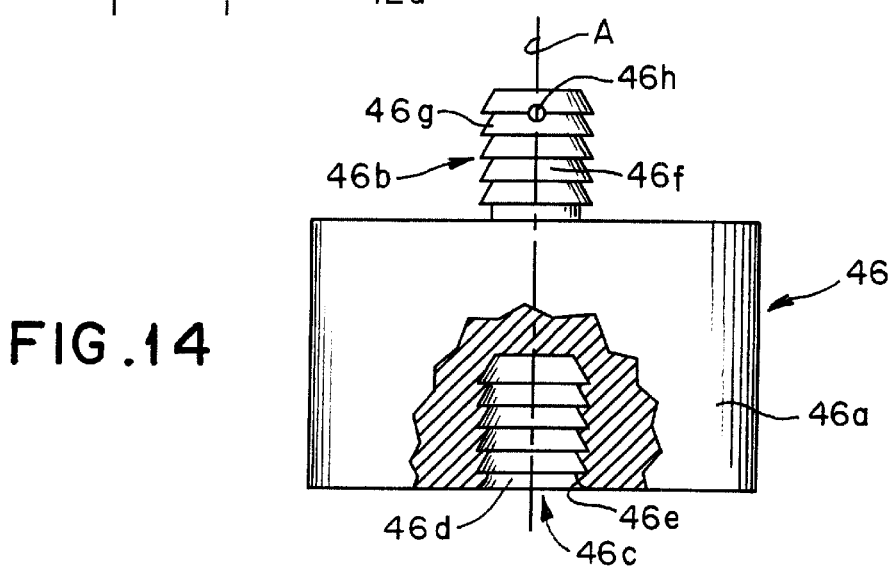
FIG. 14 is a side elevational view, partially in cross section, of still a further embodiment of the ballast weight in accordance with the present invention.

While all of the embodiments that have been described in connection with FIGS. 1–13 require substantially the same axial force both to attach two individual weights as well as to separate two adjacent weights, the embodiment 46 shown in FIG. 14 is shaped and dimensioned to facilitate insertion or attachment but resist removal or separation of the attached member from the cavity. Thus, at least one internal surface element 46d is provided within the cavity 46c that defines an angled surface 46e in relation to the direction of insertion along the axis A and the attaching member 46b is similarly provided with at least one external surface element 46f likewise provided with an angled surface 46g in relation to the direction of insertion. The angled surface elements 46e and 46g form inclined surfaces that permit relative movement in only one direction for attaching two adjacent individual weights. In the presently preferred embodiment, a plurality of such angled surface elements 46d, 46f are provided in the form of plurality of axially spaced adjacent annular ribs. Each of these ribs is provided with the requisite inclined surfaces. The ribs as well as the entire unit 46 may be molded from plastic to form relative flexible and deformable ribs, so that an attachment member 46b can be inserted into a cavity of 46c with little force applied.

As will be clear from the above description, the present invention permits a plurality of individual weights, each having a predetermined individual weight, to be attached to each other to incrementally adjust the total weight of the composite assembly in order to compensate for a predetermined lift of a balloon. This assures that the balloon can be tethered to a surface on which the composite weight is supported without significantly exceeding the lift of the balloon.

While this invention has been described in detail with particular reference to preferred embodiments thereof, it will be understood that variations and modifications will be effected within the spirit and scope of the invention as described herein and as defined in the appended claims.

What I claim:

1. Adjustable weight ballast for lighter-than-air balloon having a predetermined lift, comprising at least two individual weights; first means on each individual weight for selectively attaching and detaching two or more weights to each other to form a composite weight having a total weight at least equal to said predetermined lift; and second means for each weight for tethering the lighter-than-air balloon to said composite weight, whereby a ballast for a balloon can have its weight incrementally adjusted to an amount just greater than the predetermined lift of the balloon to thereby securely tether the balloon to a surface on which said composite weight is supported without significantly exceeding the lift of the balloon.

2. Ballast as defined in claim 1, wherein said composite weight is formed of two individual weights.

3. Ballast as defined in claim 1, wherein said individual weights are identical.

4. Ballast as defined in claim 1, wherein said individual weights are formed of metal.

5. Ballast as defined in claim 1, wherein said individual weights are formed of a non-metallic material, and a metallic insert embedded within said individual weights to provide same with predetermined incremental weight values.

6. Ballast as defined in claim 1, wherein each individual weight is formed of a body member having a cavity therein, said first means comprising an attaching member projecting from said body member and generally conforming to the size and shape of said cavity, said cavity and attaching member being shaped to secure two individual weights to each other when said attaching means of one individual weight is received within the cavity of another individual weight.

7. Ballast as defined in claim 6, wherein said cavity is cylindrical and is internally threaded and said projecting member is externally threaded for being threadingly meshed within a threaded cylindrical cavity.

8. Ballast as defined in claim 6, wherein said cavity is spherical and has an entry opening in a surface of an individual weight smaller than the maximum transverse dimension of said cavity in a direction parallel to said surface; and said projecting member has an associated maximum transverse dimension greater than said entry opening, at least one of said entry opening and projecting member being at least partially deformable to allow said projecting member to be forced through said entry opening and be received and retained with said cavity.

9. Ballast as defined in claim 8, wherein said cavity and said projecting member have circular cross sections in a plane normal to said entry opening and said projecting member.

10. Ballast as defined in claim 8, wherein said cavity and said projecting member are both spherical.

11. Ballast as defined in claim 8, further comprising at least one groove in said body member proximate to said entry opening to enhance the ability of said opening to enlarge to receive said projection member.

12. Ballast as defined in claim 6, wherein said second means comprises a hole in said attaching member.

13. Ballast as defined in claim 12, wherein said hole has an axis substantially transverse to the vertical direction when said ballast is supported on a horizontal surface.

14. Ballast as defined in claim 6, wherein said cavity is a transverse groove and said attaching member has a shape to be received within said transverse groove by sliding same from an open end of said groove.

15. Ballast as defined in claim 6, wherein said cavity is cylindrical and provided with an annular enlargement, and said attaching member comprises a cylindrical projection shaped and dimensioned to be received within said cavity with little interference, and an annular bead provided on said projection resulting in an interference fit when said projection is inserted into said cavity and dimensioned to be received in snap fitting relationship within said annular enlargement.

16. Ballast as defined in claim 6, wherein said cavity is cylindrical and provided with an annular enlargement, and said attaching member comprises a cylindrical projection shaped and dimensioned to be received within said cavity with little interference, and radial protuberances are provided on said projection resulting in an interference fit when said projection is inserted into said cavity and dimensioned to be received in snap fitting relationship within said annular enlargement.

17. Ballast as defined in claim 6, wherein said cavity and said attaching member are shaped and dimensioned to facilitate insertion but resist removal of said attaching member into said cavity.

18. Ballast as defined in claim 17, wherein said cavity is provided with at least one internal surface element defining an angled surface in relation to the direction of insertion and said attaching member has at least one external surface element defining an angled surface in relation to the direction of insertion, said angled surface elements forming inclined surfaces that permit relative movement in only one direction for attaching two adjacent individual weights.

19. Ballast as defined in claim 18, wherein a plurality of angled surface elements are provided.

20. Ballast as defined in claim 18, wherein said angled surface elements are in the form of a plurality of adjacent annular ribs.

21. A method of attaching an adjustable weight ballast to a lighter-than-air balloon having a predetermined lift, comprising the steps of:

selectively attaching or detaching two or more weights to form a composite weight having a total weight at least equal to said predetermined lift, each of the weights including means for tethering a balloon by means of a string; and tethering the lighter-than-air balloon to the composite weight by securing the string of the balloon to the tethering means of one of the weights, whereby the weight of a ballast for a balloon can have its weight incrementally adjusted to an amount just greater than the predetermined lift of the balloon thereby securely tethering the balloon to a surface, on which said composite weight is supported, without significantly exceeding the lift of the balloon.

\* \* \* \* \*